United States Patent [19]

Baker

[11] Patent Number: 4,850,147
[45] Date of Patent: Jul. 25, 1989

[54] ELECTRODE SHAPING

[75] Inventor: George E. Baker, Leire, England

[73] Assignee: Amchem Company Limited, Sileby, England

[21] Appl. No.: 142,457

[22] Filed: Jan. 11, 1988

[30] Foreign Application Priority Data

Jan. 8, 1987 [GB] United Kingdom ............. 8700336

[51] Int. Cl.⁴ .................... B24B 9/00; B24B 19/00
[52] U.S. Cl. ................................. 51/72 R; 51/98.5;
51/165.77; 51/206 EP; 51/326; 51/327
[58] Field of Search ............... 51/72 R, 72 L, 98 R,
51/98 BS, 98 SP, 98 HK, 58, 157, 165.75,
165.77, 165 R, 165.74, 325, 295, 80 R, 31, 32,
140, 178, 241 LG, 326, 327, 281 R, 285, 98.5,
389 R, 206 P

[56] References Cited

U.S. PATENT DOCUMENTS 4,534,136  8/1985  Yoshikane et al. .

Primary Examiner—Frederick R. Schmidt
Assistant Examiner—Maurina Rachuba
Attorney, Agent, or Firm—Spensley Horn Jubas & Lubitz

[57] ABSTRACT

A method of shaping a nose portion 5 of an electrode 4 in an EDM apparatus comprises, providing a grinding element 9 having a peripheral groove 10 and means for effecting relative movement between the electrode 4 and the grinding element 9, and feeding the electrode 4 into the groove 10 tangentially or normally thereto so that the nose portion 5 contacts and is ground by one of the two opposed side faces of the groove 10 to impart a complementary profile to a first side face 20 of the nose portion 5.

7 Claims, 2 Drawing Sheets

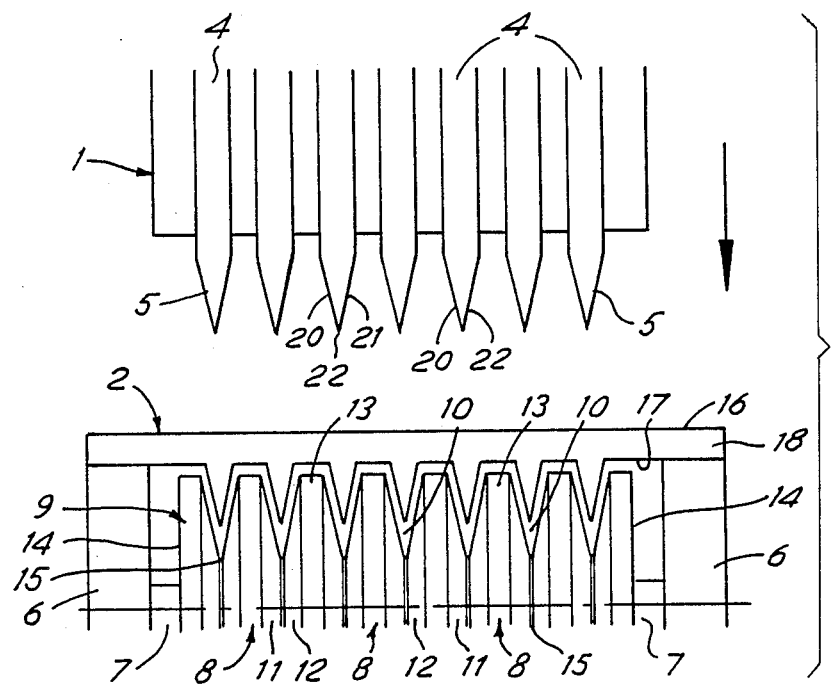
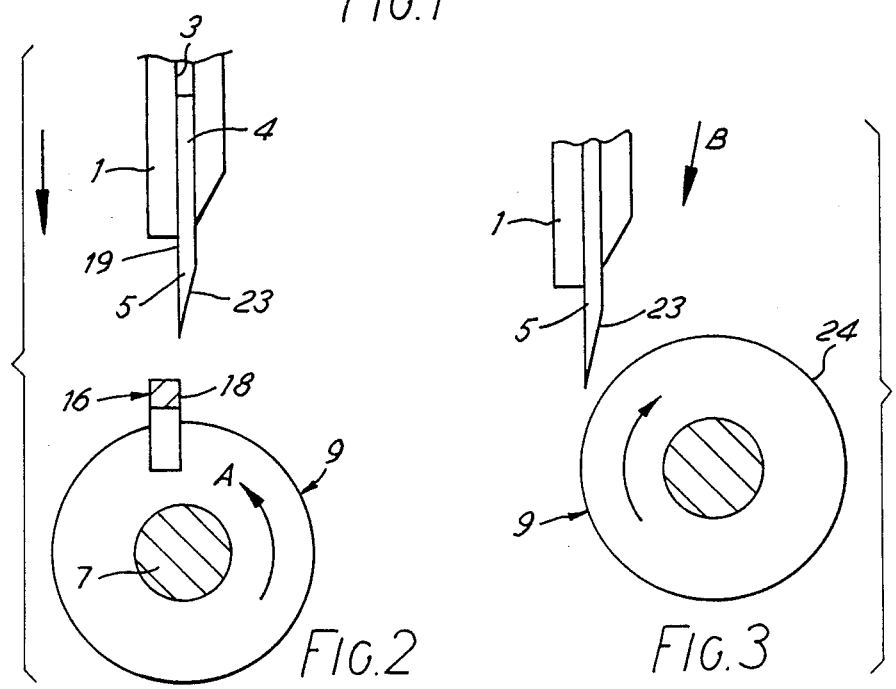
FIG.1
FIG.2  FIG.3

ELECTRODE SHAPING

The invention relates to the shaping of electrodes for electrical discharge machining (EDM) and is particularly, but not exclusively, concerned with the shaping of a plurality of electrodes mounted to EDM apparatus, and apparatus therefor.

Conventionally an electrode used in EDM for erosion of a small hole or blind bore is elongate with a flat end and is of uniform cross-section. Thus, so long as the shape of the electrode is maintained throughout a machining operation, a hole or bore of constant cross-section can be eroded. However, in certain applications such as the machining of holes in a vane of a turbine engine, it is desired to produce a hole in which an outer region is flared or counterbored.

Normally a counterbored hole is eroded using a method involving two discrete operations. The first involves machining the inner bore using an electrode of one diameter and the second operation involves machining the counterbore using another electrode of larger diameter. Such a method of machining is time consuming and usually requires the provision of two sets of electrode tooling so that both operations can be performed. In some circumstances to ensure continuity of production two EDM apparatus may be used with each dedicated to performing a respective one of the two operations.

A particular disadvantage of the above-mentioned method of counterboring is that a stepped-bore will result when in fact a smoothly flared bore may well be desired. Also, a second disadvantage is that only bores or counterbores of constant cross-section can be eroded.

The invention therefore seeks to provide a method of shaping electrodes which can be used to overcome the above-mentioned disadvantages.

According to a first aspect of the invention a method of shaping a nose portion of an electrode in an EDM apparatus comprises, providing a grinding element having a peripheral groove and means for effecting relative movement between the electrode and the grinding element, and feeding the electrode into the groove tangentially or normally thereto so that the nose portion contacts and is ground by one of the two opposed side faces of the groove to impart a complementary profile to a first side face of the nose portion.

Preferably, the nose portion contacts both side faces of the groove and is ground with opposite first and second side faces having a profile complementary to the groove side faces. Relative rotation between the grinding element and the electrode by 90° will enable a third and a fourth side face of the nose portion to be similarly ground. Each side face of the groove may have a rectilinear or any other desired profile.

Suitably the grinding element is provided with a plurality of grooves in which a corresponding plurality of electrodes can be simultaneously shaped. Preferably the grinding element consists of a plurality of individual grinding wheels mounted on a common arbor, in which confronting side faces of immediately adjacent wheels have peripheral annular regions which together form one of the grooves.

According to a second aspect of the invention a method of shaping a nose portion of an electrode in an electrical discharge machining apparatus comprises, providing a grinding element having a cylindrical surface and means for effecting relative movement between the electrode and the grinding element, and feeding the electrode to contact the surface at a constant or varying angle of approach thereto, to impart a desired profile to a first side face of the nose portion.

The invention also includes within its scope electrode shaping apparatus operatively associated with or embodied in EDM apparatus and comprising said grinding element.

The invention will now be further described with reference to the accompanying drawings which illustrate by way of example apparatus and methods in accordance with the invention. In the drawings:

FIG. 1 is a diagrammatic partial front view of one form of electrode shaping apparatus;

FIG. 2 is a sectional side view of the apparatus shown in FIG. 1;

FIG. 3 is a sectional side view of another form of apparatus; and

Figure 4A:
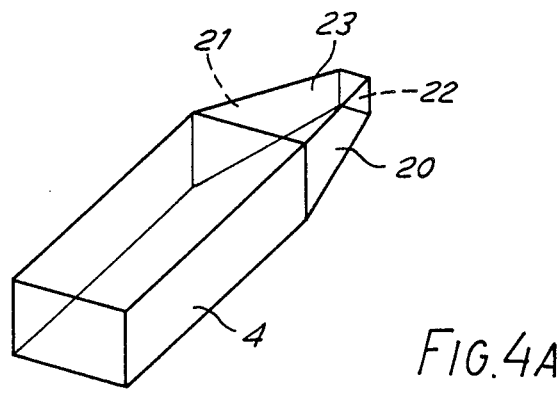
FIGS. 4a through 4c illustrates three electrode shapes which can be produced by means of the invention.

An embodiment of an electrode shaping apparatus forming a part of an electrical discharge machine is illustrated in FIGS. 1 and 2. The shaping apparatus consists of an electrode head 1 movable along a vertical Z-axis, and a grinding unit 2 mounted to a bed of the machine which is movable in a horizontal plane along mutually perpendicular X and Y axes. Movement along the three axes is effected under computer numerical control in conventional manner.

The electrode head or guide 1 has a plurality of rectangular-section channels 3 for releasably receiving a corresponding plurality of elongate electrodes 4. The electrodes 4 are suitably made of rectangular-section copper strip, though they may be instead made of cylindrical rod closely received in each channel 3. A nose portion 5 of each electrode 4 extends below the guide 1 and it is these portions 5 which are shaped and subsequently used to erode flared holes or shaped cavities.

Grinding unit 2 has a framework 6 in which an arbor 7 is rotatably mounted. The arbor 7 is rotatable in the direction A by a motor (not shown) which is conveniently pneumatically powered. A plurality of dressed grinding wheels 8 are stacked on the arbor 7 so forming a grinding element 9 provided with a plurality of peripheral grooves 10. Each of the grooves 10 is formed between an annular peripheral region 11 of one wheel 8 and a confronting annular peripheral region 12 of an immediately adjacent wheel 8.

Apart from the axially outer wheels, each wheel 8 is similarly dressed with regions 11 and 12 on opposite side faces separated by a peripheral cylindrical face 13 prior to stacking on the arbor 7. The two axially outer side faces 14 of the dressing element 9 need not be dressed as they do not form part of any groove 10. Any desired profile may be imparted to the regions 11 and 12. However, in this embodiment the regions 11 are each frusto-conical and the regions 12 are each similarly frusto-conical but with an adjoining radially inner cylindrical portion which provides a flat bottom 15 to each groove 10.

The dressing unit 2 is completed by a guide bar 16 extending above and parallel to the grinding element 9. The bar 16 is attached at both ends to the framework 6 and has a lower profiled surface 17 which conforms to an axial contour of, and is spaced from, the grinding element 9. A front face 17 of the bar 16 is aligned with a vertical radial axis of the grinding element 9, as can be seen from FIG. 2.

In a plunge grinding or shaping operation the grinding element 9 is rotated at a suitable grinding speed, typically 2500 rpm. The electrode guide 1 is moved along the Z-axis radially of the grinding element 9 so that the electrodes 4, each having a rear face 19 aligned with and abutting the front face 18 of the bar 16, are fed into the corresponding grooves 10. Thus, with the bar 16 supporting the electrodes 4 tangentially of the element 9, opposite side faces 20, 21 and a end face 22 are ground on each electrode 4 by the regions 12 and 13 of the respective groove 10. It will be clear that the grinding of opposite faces 20 and 21 simultaneously, combined with the support provided by the bar 16, advantageously prevents flexure of what is a relatively thin electrode during the grinding operation.

The operation is completed when all electrodes 4 have been ground with faces 20, 21 and 22. At the start of the operation the electrodes 4 may extend by varying lengths from the guide 1. In order to reduce material wastage it is preferred to align the electrodes ends in the guide 1 and subsequently to grind the end faces 22 on the cylindrical faces 13 of the element 9 prior to commencing the shaping operation. The shaping operation is thus completed when the previously ground end faces 22 abut the bottom 15 of the grooves. In this instance the cylindrical portion of the regions 12 of the wheels 8 are not required to grind and thus, need not be provided and in their place annular spacer plates may be used.

The above-described operation results in a plurality of electrodes having front profiles of the same cross-section as the grooves 10. To provide each of the electrodes 4 with a front face 23 the electrode nose portions 5 are now shaped by a vector grinding operation. With reference to FIG. 3 a cylindrical grinding surface 24 is required and this is provided by either a single cylindrical wheel or alternatively by a combination of all the cylindrical faces 13 of the element 9.

To vector grind the faces 23 the electrode guide 1 approaches the surface 24 along a path B at an angle of approach of $\theta$ to the tangent at the point of contact of the nose portions 5 and the surface 24. Therefore, the front faces 23 produced will likewise be inclined at an angle of 8° to that tangent. As has already been described the electrode guide 1 is constrained to move along the Z-axis only and, therefore, to enable the electrodes 4 to follow the path B a combination movement of the tool guide 1 (along the Z-axis) and the framework 6 (along the X-axis and/or the Y-axis) is required. Thus, if a non-rectilinear face 23 is required the angle of approach $\theta°$ can be varied accordingly during the vector grinding operation.

Figure 4B:
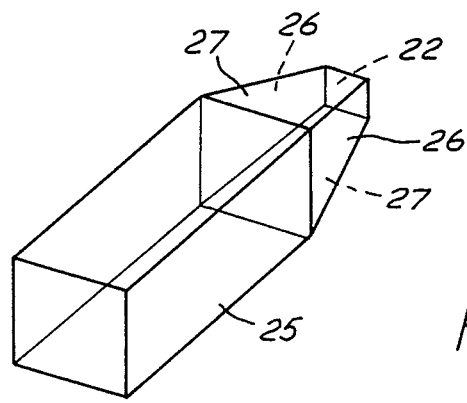
Figure 4C:
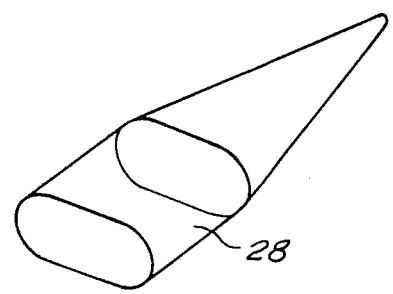

In the described example the nose portion 5 of one of the electrodes 4, shown in detail in FIG. 4, is shaped with three rectilinear faces 20, 21 and 23, and an end face 22 by a combination of both plunge grinding and vector grinding. The plunge grinding operation in this case being radial in nature will have a similar result if the apparatus is modified to make the bar 16 movable and the plunge grinding operation is conducted in a tangential manner.

A square electrode such as electrode 25 can be shaped with four side faces 26, 27 by producing first and second opposite faces 26 using a plunge grinding operation and subsequently rotating the electrode 25 or an associated groove 10 through 90° about a vertical axis and repeating the plunge grinding operation to produce third and fourth opposite faces 27. Likewise, by suitable rotation of an electrode or the grinding element 9 an electrode shape similar to that of electrode 28 can be produced. Should a plurality of electrodes need rotating in the electrode guide the latter preferably has a single element frictionally engageable with the electrodes to rotate them the requisite amount.

The above described examples have all utilised small copper electrodes with a plurality thereof suitably retained in an electrode guide. However, the invention is in no way limited to the material or initial shape of an electrode, or the manner in which it is retained.

In the described examples the grooves 10 are identical and of the same diameter, with the grinding element 9 being generally cylindrical. The invention is not limited to such a configuration and the grinding element can have a plurality of grooves of differing profiles and may be of axially varying outer peripheral profile. In such an arrangement it will be clear that the bases of the grooves may be of differing diameter.

I claim:

1. A system for shaping a nose portion of an electrode for use in an electrode discharge machine, comprising: means for holding an electrode to be shaped,
   a grinding element having a peripheral surface including at least one groove therein, the groove having at least one side face,
   means for providing relative movement between the electrode and the grinding element,
   means for feeding the electrode into the groove in a direction which is tangential or normal to the peripheral surface of the grinding element such that the nose portion contacts and is ground by the side face of the groove, whereby a profile complementary to that of the side face of the groove is imparted to the nose portion,
   the grinding element further comprising a plurality of grinding wheels mounted in a side-by-side arrangement on a common axis,
   the groove being defined by opposing peripheral regions of adjacent grinding wheels.

2. A system as claimed in claim 1, wherein the groove includes two substantially opposing side faces and wherein the nose portion contacts and is ground by the opposing side faces of the groove to thereby form substantially opposing side faces of the nose portion, the opposing side faces of the nose portion having profiles which are complementary to the profiles of the opposing side faces of the groove.

3. A system as claimed in claim 1, further comprising means for relatively rotating the nose portion and the grinding element through 90°.

4. A system as claimed in claim 3, further comprising:
   means for grinding first and second opposing side faces of the nose portion,
   means for grinding third and fourth opposing side faces of the nose portion,
   whereby four profiled side faces are provided on the nose portion.

5. A system as claimed in claim 1, wherein the side face of the groove defines a rectilinear profile.

6. A system as claimed in claim 1, wherein a plurality of substantially identical grooves are provided in the peripheral surface of the grinding element.

7. A system as claimed in claim 1, further comprising means for feeding the electrode into the groove at a varying angle of approach to the groove, whereby a desired profile is imparted to the electrode.

* * * * *